Jan. 23, 1945. R. EDWARDS 2,367,853
PLATE HOLDING DEVICE
Filed Nov. 26, 1941
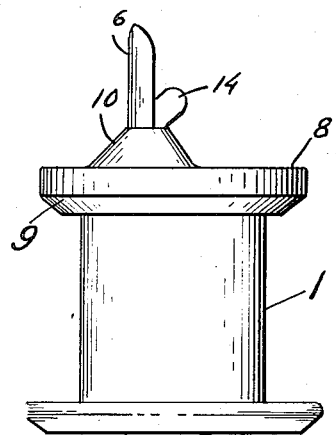
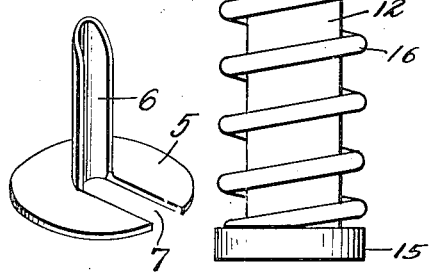
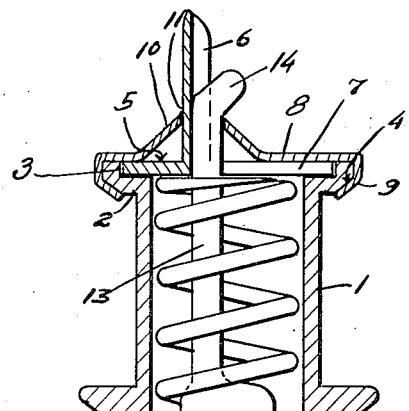
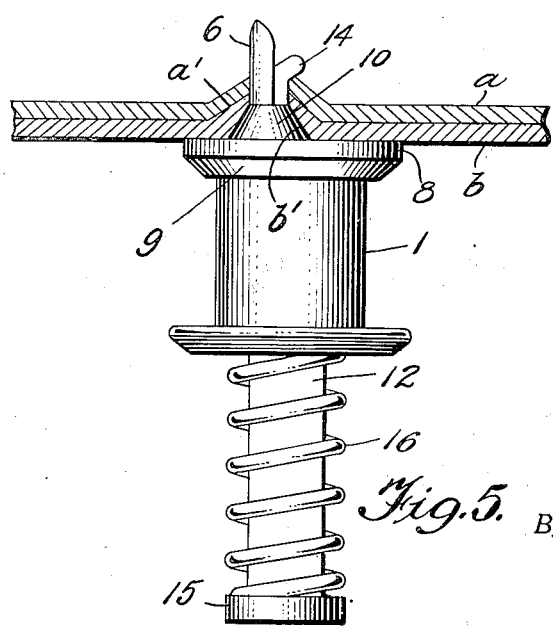
Inventor
RUSSELL EDWARDS,
By Clarence A. O'Brien
Attorney Patented Jan. 23, 1945

2,367,853

UNITED STATES PATENT OFFICE 2,367,853

PLATE HOLDING DEVICE

Russell Edwards, Pasadena, Calif., assignor to Herman H. Helbush, Los Angeles, Calif.

Application November 26, 1941, Serial No. 420,603

6 Claims. (Cl. 85—5)

This invention relates to a plate holding device, the general object of the invention being to provide means for temporarily holding two or more plates together preparatory to the riveting of the plates, the device acting to cause the holes in the plates to register so that rivets can be readily passed into the same.

This invention also consists in certain other features of construction and in the combination and arrangement of the several parts to be hereinafter fully described, illustrated in the accompanying drawing and specifically pointed out in the appended claims.

In describing the invention in detail reference will be had to the accompanying drawing wherein like characters denote like or corresponding parts throughout the several views, and in which:

Figure 1 is an elevational view of the device.

Figure 2 is a top plan view thereof.

Figure 3 is a section on the line 3—3 of Figure 2.

Figure 4 is a view of the plate provided with the teat.

Fig. 5 is a view partly in side elevation and partly in section showing the device applied.

In these views the numeral 1 indicates a spool-shaped cylinder, or body, of substantially spool shape with the front end flange 2 recessed as shown at 3 and its corner beveled as shown at 4. A plate 5 fits in the recess 3 and is formed with a teat 6 of substantially semi-circular shape in cross section with its free end pointed as shown more clearly in Figure 4. This teat is formed by cutting the plate and bending the part between the cut to form the teat, thus leaving a slot 7 in the plate.

A cap 8 is fastened to the front flange 2 by having its flange 9 bent or crimped, over the flange of the cylinder with a portion of the flange engaging the bevel 4. Said cap has a substantially conical part 10 pressed outwardly therefrom and the apex of the cone is cut away to form a hole 11 for the passage of the teat 6.

As shown the conical part 10 and the teat are eccentrically located on the cap and the plate respectively.

The plunger is shown at 12 and has a reduced front part 13 ending in an angular point 14. A flange 15 is formed on the rear end of the plunger and a spring 16 encircles the plunger and has one end bearing against the flange 15 and the other against the plate 5.

In using the device the plunger is projected so the angular point 14 is extended from the teat 6 and then this point 14 is placed in the holes of a pair of plates, the device being tilted to permit the point 14 to enter the holes and then by straightening the device the point will move the plates or one plate relative to the other so that the holes in the two plates will register and then the device is moved toward the plates so that the teat 6 will enter the holes and this teat and the straight part 13 of the plunger will hold the plates together with all the holes registering so that rivets can be placed in those holes not occupied by the teat 6 and the plunger. Then the device is withdrawn and the device is tilted to permit the part 14 of the plunger to pass through the two holes occupied by the device.

By providing the conical part 10 the device can be used with plates such as shown at $a$, $b$ having countersunk holes $a'$, $b'$ therein for receiving rivets which have their heads flush with the plates or with one plate when the riveting is completed.

This invention can be formed from devices now on the market by providing the recess 3 in the cylinder 1 of such a device and applying the plate 5 with its teat 6 to the cylinder of this device and then placing cap 8 on the cylinder. This will permit devices to be used which ordinarily would have to be thrown away due to breakage or the wearing out of such devices.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In a device of the class described, a cylinder, a plate fitting in one end of the cylinder and having an opening therein, a teat of substantially semi-circular shape in cross section extending from the plate and located at one end of the opening, a cap connected with the cylinder and holding the plate in position and a plunger passing through the cylinder and through the opening in the plate with an end portion of the plunger fitting in the teat, said end portion having a point extending at an angle from the plunger, and said cap having a substantially conical projection extending therefrom having a centrally arranged hole therein through which the teat and the plunger extend.

2. In a device of the class described, a cylinder having a flange at one end and a recess in said end, a slotted plate fitting in the recess, a teat extending from the plate and said teat being of substantially semi-circular shape in cross section and having a pointed end, a cap having a flange bent over the flange of the cylinder and said cap having a substantially conical projection extending therefrom having a centrally arranged hole therein through which the teat extends, and a spring-pressed plunger having an end portion passing through the slot in the plate, through the hole in the cap and having a portion sliding in the teat with the end of said portion extending at an angle from the teat.

3. In a clamp for aligning apertured plates and holding the same together, a hollow body having open ends, a plate opposed to one end of said body and having a transversely semicircular elongated part extending therefrom outwardly of said end and for insertion through the apertures of said plates, a spring retracted plunger extending through said body and plate and having an angular clamping end slidable in said part and held thereby against turning, and a cap member secured to said end of the body to secure said plate to said end and apertured for the extension of said part and plunger therethrough, said cap member forming a clamping member opposed to the clamping end of the plunger.

4. In a clamp for aligning apertured plates and holding the same together, a hollow body having open ends, a plate opposed to one end of said body and having a transversely semicircular elongated part extending therefrom outwardly of said end and for insertion through the apertures of said plates, a spring retracted plunger extending through said body and plate and having an angular clamping end slidable in said part and held thereby against turning, and a cap member secured to said end of the body to secure said plate to said end and apertured for the extension of said part and plunger therethrough, said cap member forming a clamping member opposed to the clamping end of the plunger, and having a conical projection through which said part and plunger extend and for fitting in said apertures.

5. In a device for temporarily holding together superposed sheets having registering perforations, one of which perforations has a countersink, a cylindric body having an end portion presenting a projection insertable in and conforming to the shape of the countersink, said end portion and projection having an opening therethrough, an elongated retaining member reciprocally mounted in the body, the outer end of the retaining member extending through said projection and being protractable and retractable with respect thereto whereby to engage and clamp said sheets inwardly against the projection.

6. In a device for temporarily holding together superposed sheets having registering perforations, one of which perforations has a countersink, a cylindric body having an end projection insertable in and conforming to the shape of the countersink, said projection having a central opening, a portion extending outwardly from the projection, said portion being insertable in and conforming to the shape of the perforations, an elongated retaining member reciprocally mounted in the body and extending through said projection and portion and means on the outer end of the retaining member functioning to clamp said sheets against the projection.

RUSSELL EDWARDS.